Sept. 5, 1944.  J. M. HALL  2,357,649
METHOD OF AND APPARATUS FOR DEHYDRATING LIQUID PRODUCTS
Filed July 2, 1941  2 Sheets-Sheet 1
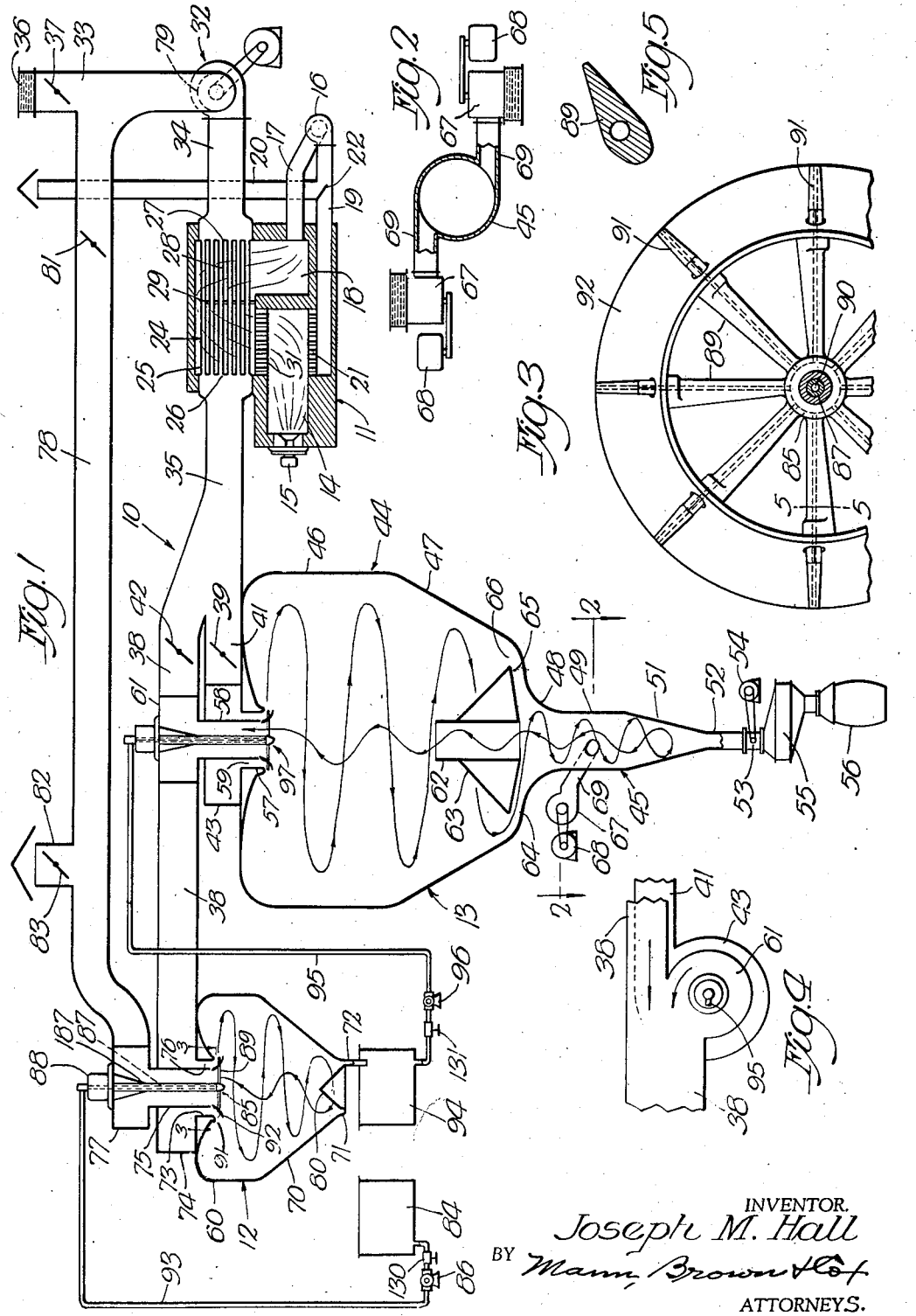
INVENTOR.
Joseph M. Hall
BY Mann, Brown &Co
ATTORNEYS.

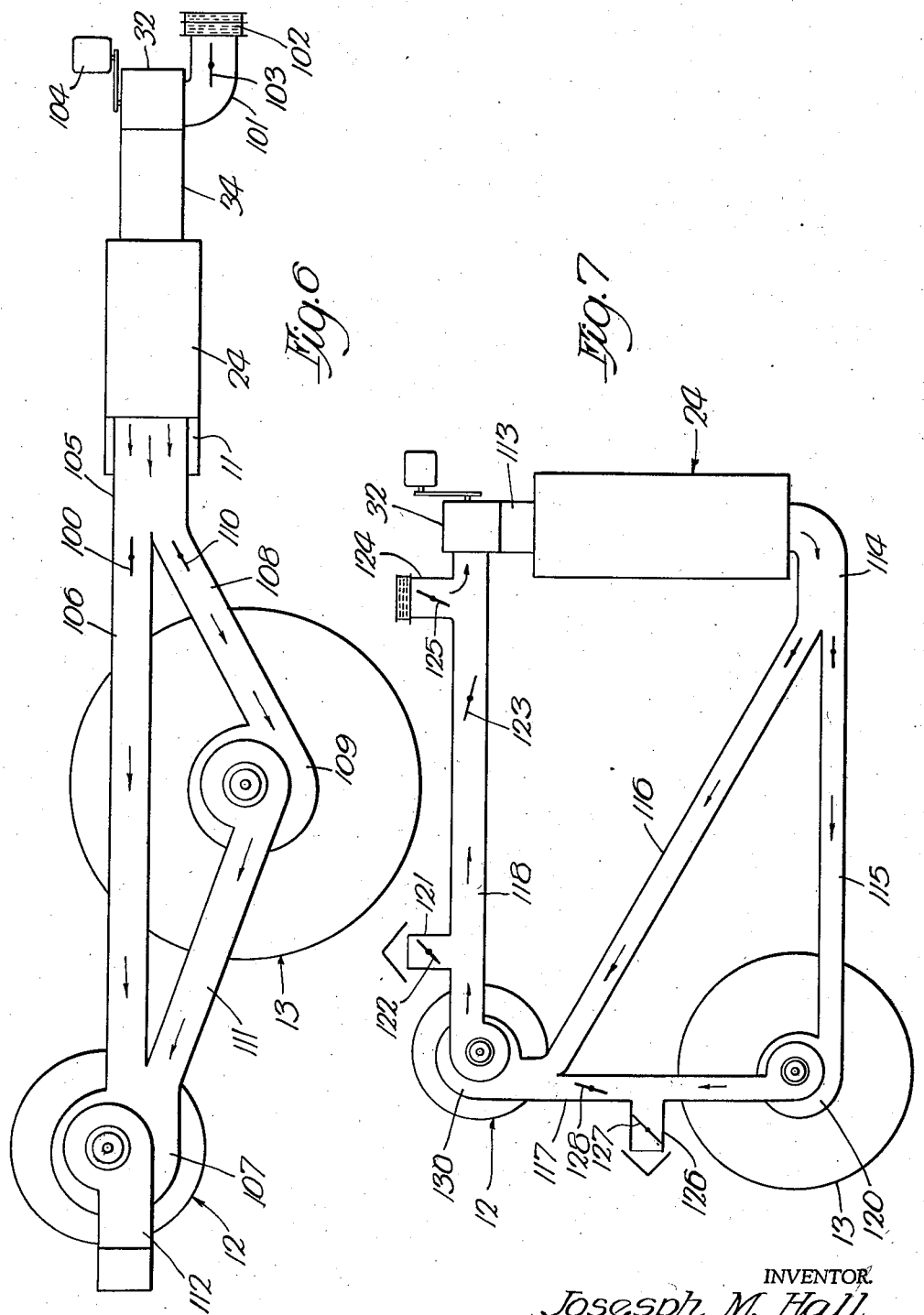

Patented Sept. 5, 1944

2,357,649

UNITED STATES PATENT OFFICE 2,357,649

METHOD OF AND APPARATUS FOR DEHYDRATING LIQUID PRODUCTS

Joseph M. Hall, Chicago, Ill., assignor to Drying & Concentrating Company, a corporation of Delaware Application July 2, 1941, Serial No. 400,759

6 Claims. (Cl. 159—4)

This invention relates to dehydrating systems and more particularly to apparatus for dehydrating food and other products by the aid of gaseous drying mediums.

One of the objects of the invention is the provision of a new and improved dehydrating system that is flexible in its adjustments and that is adapted to dehydrate liquid products having different characteristics and that require radically different treatments.

Another object of the invention is the provision of a new and improved system for dehydrating liquid products together with novel means for controlling the operation of the system.

Another object of the invention is the provision of a new and improved method of dehydrating liquid products whereby the dehydrated product may have the desired density and may be ready for storage when the process is completed.

A still further object of the invention is the provision of a new and improved dehydrating system that is inexpensive to manufacture, easily assembled, efficient in operation and that is extremely flexible in its adjustments and in its operation.

Other and further objects and advantages of the invention will appear from the following description, taken in connection with the accompanying drawings, in which—

Fig. 1 is a side elevation of the dehydrating system shown more or less diagrammatically, with parts broken away and parts in section;

Fig. 2 is a section on the line 2—2 of Fig. 1 showing the distributor head and associated parts;

Fig. 3 is a section on the line 3—3 of Fig. 1;

Fig. 4 is a top plan view of the snails above the dehydrator chamber shown in Fig. 1;

Fig. 5 is a section on the line 5—5 of Fig. 3;

Fig. 6 is a diagrammatic plan view of a modified form of apparatus; and

Fig. 7 is a further modified form of dehydrating apparatus.

In dehydrating liquid products in a system depending on a heated drying gaseous medium for removing the moisture from the sprayed particles of the product, there are numerous factors to be considered. In dehydrating some products, such as citrus juices, the humidity of the gaseous medium employed must be low while, on the other hand, in dehydrating other liquid products, such as glues, gelatins, resins and certain chemicals, the humidity may be relatively high. Again, the treatment of any liquid product will vary depending on the weight desired for a given volume of the dried product. For instance, if milk be dehydrated and the dried particles weigh a given amount per quart and it is desired that the weight per quart be higher, then the milk must have a higher or greater degree of concentration before it is sprayed into the dehydrating chamber. If it is desired that the dehydrated product per volume shall weigh less, then the concentration is less so that the concentrate will have a low degree of concentration; that is, a small percentage only of the moisture is removed.

The present system is so designed that it may be easily adjusted or operated to meet these various requirements.

Referring now to the drawings, the reference character 10 designates a dehydrating system which comprises essentially a furnace 11 for heating the drying medium, a concentrator or concentrator chamber 12 for concentrating the liquid product and a dehydrator or dehydrating chamber 13 for dehydrating the concentrate.

The furnace 11 is provided with a combustion chamber 14, a burner 15 for discharging a combustible mixture of liquid fuel and air into the furnace where it is ignited and burns in the usual manner. The furnace, if desired, may be provided with a forced draft comprising a blower 16, an intake conduit 17 through which combustion gases from the heating chamber 18 pass into the fan. These heated gases are discharged through the fan discharge conduit 19 where they divide, a portion going into the stack 20 and a portion through the grates 21 into the combustion chamber 14 for increasing the velocity of the gases of combustion through the heater and for mingling with those gases whereby the temperature of the combustion gases is somewhat lowered whereby burning of the tubes is prevented. The passage 19 is provided with a gate or valve 22 for varying the amount of the gases diverted into the stack 20 where they are conducted to the exterior of the system. The fan is so constructed that fresh air may also enter the intake thereof, as is usual in such constructions.

Since the specific construction of the heating system constitutes no part of the present invention, it is not thought necessary to illustrate or describe the same more in detail further than to state the gate or valve 22 may be adjusted to any desired position for dividing the discharge from the fan to direct a portion or all up the stack and a part or none along the conduit 19 into the combustion chamber.

Mounted in the upper portion of the furnace 11 is a heating device or heater 24 which comprises a casing 25 having the perforated end walls or flue sheets 26 and 27. Secured in the end walls or flue sheets 26 and 27 are a plurality of flues or tubes 28 through which the drying fluid flows, as will presently appear.

A baffle 29 may be provided in the casing or chamber 25 for diverting the heated gases from the combustion chamber 14 and which pass upwardly through the grill 31 upwardly above the baffle 29. These gases then pass downwardly around the front portions of the tubes 28 and outwardly to the fan through the conduit 17.

Suitable means are provided for conducting a gaseous drying medium, such as air, through the heater 24. As shown, a blower 32 having a fresh air intake conduit 33 and a discharge conduit 34 is provided for this purpose. The conduit 34 conducts the air to the heater and after the air passes through the tubes 28, where it is heated, it passes into the conduit 35 which conducts the heated gases to the dehydrator 13 and to the concentrator 12.

The upper end of the intake conduit 33 is, preferably, though not necessarily, provided with a screen or filter 36 through which fresh air is adapted to enter. A valve 37 is provided for controlling the amount of air entering the fan through the conduit 33.

The conduit 35 is provided with a branch conduit 38 for dividing the air that flows along the conduit 35 and for conducting this portion of the air from the heating unit or heater directly to the concentrator 12.

The section 41 of the main conduit 35 that extends beyond the juncture of the branch conduit 38 is provided with a valve 39 for controlling the amount of air admitted to the dehydrator 13. The valve 39 is so constructed that it may entirely close the portion 41 of the conduit 35 that contains the valve.

The branch conduit 38 is also provided with a valve 42 which may be adjusted to either close the conduit 38 or admit the desired amount of air to flow past the valve.

The extension 41 of the conduit 35 is connected to a snail 43 mounted on the dehydrator 13 and which directs the air downwardly in a spiral into this dehydrator chamber.

The dehydrator 13 comprises an upper section 44 and a lower section 45. The upper section 44 has an upper cylindrical portion 46 and a lower tapered portion 47 which is integral with the upper end of the lower section 45. The section 45 comprises an upper portion 48 that flares upwardly and merges into the lower portion 47 of the upper section and a cylindrical portion 49 integral with the tapered portion 48. The lower end of the lower section 45 is tapered downwardly as at 51 and merges with a conduit 52 through which the dehydrated particles are discharged from the dehydrator by a valve 53 operated by a motor 54 in the usual manner.

The lower section 45, being of considerable smaller diameter than the upper section, functions as a very efficient device for separating the product from the drying medium by centrifugal force due to the increase in the speed of the drying medium as a result of narrowing the inclosure and of adding fresh air tangentially to this section, as will presently appear. By lengthening the cylindrical portion 49, the efficiency of the lower section is increased.

A conventional power operated screen 55 is provided below the discharge valve 53 and through which the dried particles are caused to pass and be discharged into a suitable receptacle 56 in the usual manner.

Since the details of the screen 55 and the valve 53 constitute no part of the present invention, it is not thought necessary to illustrate or describe the same more in detail.

The upper section 44 of the dehydrator 13 has its upper wall slightly depressed and is provided with an axial opening in which a short conduit 57 is secured. The upper end of the conduit 57 has attached thereto the lower wall of the snail 43 of the extension conduit 41 so that the air passing along the extension 41 into the snail 43 will be directed downwardly in a spiral through the conduit 57. A discharge conduit 58 for the drying medium is provided for the dehydrator chamber 13 and the same is arranged concentric with the conduit 57. As shown, the discharge conduit 58 extends axially upwardly through the conduit 57 and is spaced inwardly from the conduit to form an annular passage 59 through which the gaseous drying medium passes from the snail 43. The conduit 58 extends upwardly through the extension conduit 41 and terminates in a snail 61 through which the air passing upwardly through the sleeve 58 may escape from the snail 61 into the branch conduit 38, as shown more clearly in Fig. 4 of the drawings.

It will thus be seen that the gaseous drying medium will pass into the dehydrator 13 through the extension conduit 41 and passage 59 and that the same will move spirally downwardly within the chamber and then will move spirally upwardly in an inner spiral through the conduit 58 in contact with the outer spiral into the snail 61 and escape outwardly into the branch conduit 38.

As shown more clearly in Fig. 4, the gaseous drying medium that passes the valve 42 direct from the heater 24 will pass along the conduit 38 tangent to the snail 61 and will mingle with that discharged from the dehydrator 13 and be carried over to the concentrator 12. By means of these valves 39 and 42, the temperature of the drying medium passing into the concentrator 12 may be varied as desired or as required by the liquid product that is being treated.

The outer spirally moving drying medium will tend to reverse at the junction of the sections 47 and 48 but in order to insure the continued downward movement of the outer spiral into the lower section 45, suitable mechanism is provided. As shown, the lower portion of the dehydrator chamber 13 has mounted therein a short conduit 62 which is arranged axially of the dehydrator chamber. A hollow cone-shaped deflector member 63 is rigidly attached to the upper portion of the conduit 62 and extends downwardly to a position adjacent to the lower wall 64 of the upper section of the dehydrator chamber thus forming a passage 65 beneath the deflector member 63 through which the air constituting the outer spiral may flow downwardly into the lower section 45 of the chamber. The conduit 62 and deflector member 63 are supported in operative position by any suitable means such as the brackets 66.

In dehydrating liquid products that are not affected by comparatively high temperatures, the drying medium employed may be heated to the most efficient temperature and in that event, it is desirable that the powder or dehydrated particles be cooled before they are stored for future use. In the construction shown, suitable means are provided for introducing a stream of cool air into the lower section of the dehydrating chamber for cooling the product. As shown, a blower 67 operated by a motor 68 delivers fresh air through a conduit 69 tangentially into an intermediate portion of the lower section 45. This air will not only lower the temperature of the particles but, being comparatively dry, will also lower the relative humidity of the air within the chamber.

The concentrator or concentrator chamber 12 is of the cyclone type and comprises an upper cylindrical section 60 and a lower tapered section 70. The lower portion of the section 70 is provided with an upstanding conical member 80 forming a channel 71 around the base of the same for conducting the concentrate flowing down the walls of the chamber to a discharge conduit 72. The upper portion 60 of the concentrator chamber is depressed and has an axial opening bounded by an upstanding conduit 73 which is integral with a snail 74. The conduit section 38 is connected tangentially to the snail 74 in a manner similar to the conduit 41 and snail 43 of the dehydrator 13. In other words, the drying medium passing from the dehydrator 13 and from the heater 24 is conducted along the conduit 38 into the snail 74 which causes the same to move downwardly in a spiral and within the concentrator chamber 12.

A conduit 75 is provided which is coaxial with the conduit 73 for conducting the drying medium from the concentrator 12. The conduit 75 extends upwardly through the snail 74 as shown in Fig. 1 of the drawings. This conduit is of less diameter than the conduit 73 to provide an inlet passage 76 around the conduit 75 for the drying medium entering the concentrator. A snail 77 is provided on the upper end of the conduit 75 above the snail 74 for directing the drying medium laterally into a return conduit 78. The return conduit 78 is in communication with the upstanding conduit 33 which, in turn, is in communication with the intake 79 of the fan 32.

Under certain conditions, it may be desired that none, or only part, of the drying medium from the concentrator 12 be returned to the fan 32. Suitable valves are therefore provided for varying the amount of drying medium recirculated. As shown, conduit 78 is provided with a valve 81 which may be adjusted to any position between fully opened and fully closed positions. When in fully closed position, none of the drying medium from the concentrator will be permitted to enter the intake of the fan. A discharge passage 82 having an adjustable valve 83 therein may be provided through which the drying medium from the concentrator chamber 12 may be discharged from the system. When the valve 81 is entirely closed, the valve 83 is fully opened and vice versa, so that all, or none, of the drying medium passing through the conduit 78 will be discharged through the conduit 82. If only a portion of the drying medium is to be discharged to the atmosphere, both valves will be partially open, as will be evident from an inspection of Fig. 1.

Suitable means are provided for supplying the liquid product to the concentrator chamber 12 and the concentrate to the dehydrator 13. As shown, the liquid product is contained in a reservoir 84 and means are provided for delivering the same to a spraying mechanism or spray head 85 located within the upper portion of the concentrator 12.

The reservoir 84 may be so mounted that the liquid will be delivered to the spraying mechanism by gravity or, as shown, a pump 66 may be provided for delivering the liquid to the spraying mechanism. The spraying mechanism 85 is substantially like that shown in my Patent No. 2,287,795, issued June 30, 1942, for Mechanism for removing moisture from liquid products. Since the details of the spraying mechanism constitute no part of the present invention, it is not thought necessary to specifically illustrate or describe the same further than to state that the hollow rotating shaft 87 surrounded by a protecting sleeve 187 extends downwardly into the upper portion of the concentrator 12 and has an axial passage 90 for conducting the liquid product to the spray head. This rotating shaft may be, and preferably is, an extension of the armature shaft of a motor 88 mounted on the snail 77. The lower end of the shaft 87 has attached thereto a spray head 85 having radially extending apertured arms 89 in the ends of which are secured spray nozzles 91. The arms 89 are oblong in cross-section, as shown in Fig. 5, to form fan blades. The head turns in the direction of rotation of the drying medium of the inner spiral and assists in rotating said medium and discharging the same from the chamber 12.

The outer ends of the arms 89 may be connected together by a rim which assists in rigidifying the structure and forms an annular deflector 92, concave on its outer surface. The nozzles 91 extend outwardly beyond the concave surface of the deflector and are detachably connected to said arms. The nozzles are detachable so that they may be replaced by nozzles having larger or smaller bores therethrough as required by the particular liquid product that is being treated. If the liquid is thin, nozzles with smaller bores are employed.

The shaft 87, and with it the head 85, is adapted to be rotated at comparatively high velocity by the motor 88 and the liquid to be atomized is conducted by pipe 93 to the hollow shaft 87 by the pump 86. This liquid passes downwardly through the shaft 87 into the head 85 and is thrown outwardly by centrifugal force through the nozzles 91 in the form of a spray into the drying medium passing downwardly through the passage 76. The head 85 rotates in the same direction as the spirally moving drying medium and, consequently, assists in the rotation of said medium. This gaseous drying medium rotates spirally downwardly to the bottom of the concentrator in an outer spiral and then reverses its direction and moves upwardly in an inner spiral through the passage 75 into the conduit 78. The arms 89, being made in the form of fan blades, materially assist the discharge of the drying medium from the concentrator chamber. The concentrate collects in the channel 71 and is discharged through the discharge passage 72 into a container 94 from which it is conducted by a pipe 95, with the aid of a pump 96, to the dehydrator 13. The dehydrator 13 is provided with a spray mechanism 97 similar to the spray mechanism 85 of the concentrator 12. Since the spray mechanism and cooperating parts are substantially the same as that already described, it is not thought necessary to repeat the description at this point.

Within the dehydrator 13, the concentrate or concentrated liquid from the container 94 is sprayed into the outer spiral of the drying medium where the moisture is removed and the dried particles are thrown by centrifugal force against the walls of the dehydrator and slide downwardly along said walls to the discharge conduit at the bottom of the cabinet. Any impalpable particles of material that are carried over into the inner spiral are thrown outwardly by the inner spiral into this outer spiral and by the outer spiral thrown outwardly against the walls of the cabinet.

In Fig. 6 is shown a modified form of the construction. In this form of the device, the dehydrator chamber 13 and the concentrator chamber 12 are the same as that already described. Likewise, the heater 24 and furnace 11 may be the same as that disclosed in Fig. 1.

In this form of construction, air is employed as the heating medium but it is not recirculated through the system. Air enters the fan 32 through the conduit 101 and the discharge conduit 34 of the fan conducts the air to the heater 24 in the manner already described. The conduit 101 may have a screen or filter 102 in its outer end for cleaning the air entering the system. A valve 103 is provided in the conduit 101 for controlling the amount of air entering the fan 32. The fan is adapted to be operated by a suitable motor 104. A conduit 105 conducts the heated air from the heater 24 and this conduit 105 is divided—one section 106 conducts a portion of the heated air directly to the snail 107 of the concentrator 12 while the other section 108 conducts the air to the snail 109 above the dehydrator 13.

Sections 106 and 108 are provided with suitable valves 100 and 110, respectively, for controlling the amount of heated air passing from the heater through these branch conduits. The heated air from the dehydrator passes through a conduit 111 to the snail 107 where it merges with air passing through the conduit 106 into the snail 107. The heated air from the concentrator 12 passes outwardly through a conduit 112 into the atmosphere.

The form of the apparatus shown in Fig. 7 differs from that shown in Fig. 6 in that it may be so adjusted as to form a closed system for the circulation of the heated gaseous drying medium. In this form of device, the heater 24, which may be the same as that disclosed in Fig. 1, is adapted to heat the drying medium as it passes through from the fan 32, as in the previous constructions. The fan discharges through conduit 113 into the heater and the discharge conduit 114 from the heater divides one branch 115 delivering the drying medium to the snail 120 of the dehydrator 13, while the other branch 116 delivers the gaseous drying medium to the snail 130 of the concentrator chamber 12.

The drying medium from the dehydrator 13 is conducted along a conductor 117 into the snail 130 where it merges with the drying medium passing along the conduit 116. The drying medium discharged from the concentrator passes along conduit 118 back to the fan 32, thus completing its cycle of circulation.

The conduit 118 may, if desired, be provided with a discharge conduit 121 having a valve 122 therein for controlling the amount of drying medium discharged through the conduit 121 to the atmosphere. A valve 123, between the fan 32 and the conduit 121, may also be provided in the conduit 118 for controlling the amount of the drying medium delivered back to the fan 32.

The conduit 118 may be provided adjacent to the fan 32 with an intake conduit 124 for said fan whereby fresh air may be introduced into the system. This conduit may be provided with a valve 125 for controlling the amount of fresh air introduced into the system as in the construction shown in Fig. 1.

A discharge conduit 126 may be provided in the conduit 117 whereby, if desired, the drying medium from the dehydrator 13 may be discharged in whole or in part into the atmosphere. A valve 127 is provided in the conduit 126 for controlling the amount of drying gaseous medium discharged through this conduit 126. A valve 128 is provided in the conduit 117 between the dehydrator 13 and concentrator 12 for controlling the amount of air passing to the concentrator from the dehydrator chamber.

The spraying of the product and the means for conducting the same from the reservoir of the concentrator and to the dehydrator are the same as have been described above. It is not thought necessary to duplicate the illustration or to repeat the description of this feature of the invention at this point any further than to state that if the dehydrators 13 are used alone without previously concentrating the material, the liquid product supplied to the dehydrator is placed in the receptacle 94 to start with.

It will thus be seen that with this latter construction, the concentrator and dehydrator may be operated independently or together as occasion may require. It will also be noted that in all forms of the device, provision is made for dividing the gaseous drying medium from the furnace in any desired proportions as required by the particular product treated or for obtaining a product of the desired density.

Since the operation of the dehydrator, concentrator, fan and heater, shown in this construction, is the same as that previously described, it is not thought necessary to repeat a description of the operation of the system with reference to this construction.

The amount of moisture left in the liquid product after passing through the concentrator chamber 12 may be varied by varying the temperature of the drying medium or by varying the amount of heated air diverted to the evaporator chamber or by varying the amount of the product delivered to the chamber.

Substantially the same method may be employed for treating the product in the dehydrator chamber 13.

In varying the amount of liquid product delivered to the two chambers, the pumps 86 and 96 may be of the variable type or valves 130 and 131 may be employed in the lines 93 and 94, respectively, anterior to the pumps 86 and 93.

The liquid products have various temperatures above which they may not safely be heated during their dehydration. In order to preserve the vitamins in certain products and prevent oxidation or chemical decomposition in others, it is imperative that the temperatures within the drying chambers be closely controlled. It has been found that with this system, the temperature of the drying medium may be above what would be expected because of the temporary character of the exposure and the cooling effect of the evaporating moisture. In practice, in the operation of the system, the operator, in starting, brings the drying gaseous medium up to the desired temperature and during the operation of the system, the temperature of the dehydrating chamber is maintained at a substantially constant temperature by controlling the feed of the pump that supplies the concentrate thereto. Likewise, the temperature of the concentrating chamber may be maintained substantially constant by controlling the feed of the pump that supplies the liquid product to the concentrator. The relative temperatures of the two chambers may be controlled by the valves that control the relative amounts of the drying medium supplied to the two chambers.

While the above description is directed to the system operating as a desiccating apparatus, it is understood that the same may operate as a concentrating device with a concentrated liquid instead of a dry powder as the final product.

The terms "concentrator" and "dehydrator" are used for convenience in identifying the parts and are not necessarily intended as words of limitation since the claims are intended to be construed as broadly as the state of the art will permit.

It is thought from the foregoing, taken in connection with the accompanying drawings, that the construction and operation of my device will be apparent to those skilled in the art and that changes in size, shape, proportion and detail may be made without departing from the spirit and scope of the appended claims.

I claim as my invention:

1. In a system for dehydrating a liquid product, a heater, a concentrator chamber, a dehydrator chamber, a fan, a conduit for conducting a gaseous drying medium to said heater from the discharge of said fan, means for conducting said medium from said heater and for discharging the same through an axial opening only into said chambers in series, means for bypassing a part or all of said medium around said dehydrator chamber to said concentrator chamber, means for conducting said drying medium from said concentrator directly back to said fan, means anterior of said fan for discharging a variable portion of said medium into the atmosphere, means for spraying a liquid product into said medium as it enters axially into said concentrator chamber, means for spraying the concentrate from said concentrator chamber into said medium as it enters axially into said dehydrator chamber; and means for introducing a current of cool air into the lower portion of said dehydrator chamber for cooling the dehydrated material and the medium before they are discharged from said last-named chamber.

2. A method of dehydrating a liquid product which comprises heating a drying medium in a dehydrating system, dividing the medium, causing one portion thereof to flow in a downwardly moving outer spiral into a dehydrating chamber and then in an inner upwardly moving spiral from said chamber, then mixing the last-named drying medium with the other portion of the first-named medium and causing the mixture to move downwardly in an outer spiral in a second dehydrating chamber and then upwardly in an inner spiral out of said second chamber, then discharging a portion of the mixture into the atmosphere, adding air from the atmosphere to said mixture, repeating the process in one continuous operation and simultaneously spraying a liquid product into the outer spiral of the drying medium in the second-named chamber and spraying the concentrate into the outer spiral of the first-named chamber, and finally adjusting the relative amounts of the product and concentrate sprayed into said chambers and the relative amounts of drying medium and air discharged and introduced into said system.

3. In a system for dehydrating a liquid product, a heater having a gas inlet flue and a hot gas outlet flue, a concentrating chamber and a dehydrator chamber each having a hot gas inlet and a hot gas outlet, branch conduits connected to the heater outlet flue and to the dehydrator chamber inlet and outlet respectively, a conduit connecting the dehydrator chamber outlet with the concentrating chamber inlet, a conduit connecting the concentrating chamber outlet with the heater inlet flue, a valve in each of said branch conduits for controlling the proportion of hot gas direct from the heater and that discharged from the dehydrator chamber which are mixed in the conduit connecting the two chambers, and means for spraying a liquid product first into the concentrating chamber and then into the dehydrator chamber.

4. In a system for dehydrating a liquid product, a heater having a gas inlet flue and a hot gas outlet flue, a concentrating chamber having a hot gas inlet and a hot gas outlet, a dehydrator chamber having a hot gas inlet and a hot gas outlet concentrically arranged at the top of said chamber, branch conduits connected to the heater outlet flue and to the dehydrator chamber inlet and outlet respectively, a conduit connecting the dehydrator chamber outlet with the concentrating chamber inlet, a conduit connecting the concentrating chamber outlet with the heater inlet flue, a valve in each of said branch conduits for controlling the proportion of hot gas direct from the heater and that discharged from the dehydrator chamber which are mixed in the conduit connecting the two chambers, and means for spraying a liquid product first into the concentrating chamber and then into the dehydrator chamber.

5. In a system for dehydrating a liquid product, a pair of evaporating chambers for removing moisture from a liquid product, a heater, a fan, means for conducting a gaseous drying medium from said fan through said heater to said chambers, means for causing said drying medium to flow first spirally downwardly in said chambers and then spirally upward from said chambers, means for delivering part of the medium directly from the heater to one chamber, means for mixing the remainder of the medium delivered by said heater with the medium discharged from the last named chamber and for delivering the mixture to the other chamber, means for selectively varying the proportion of medium delivered to said one chamber, means for spraying a liquid product into said medium within said chambers for removing the moisture therefrom, and means for causing a portion only of said medium to be recirculated through said heater.

6. A method of dehydrating a liquid product which comprises heating a drying medium in a dehydrating system, dividing the medium, causing one portion thereof to flow down into a dehydrating chamber and be discharged therefrom, then mixing the discharge with the other portion of the divided medium and causing the mixture to move down into a second dehydrating chamber and be discharged therefrom, discharging a portion of said discharge to the atmosphere, returning the remainder to be heated and recirculated, adding air from the atmosphere to the medium in one of said chambers, spraying a liquid product into the medium in the second-named chamber, spraying the concentrate into the medium in the first-named chamber and removing the dehydrated product therefrom, and regulating the relative quantities of medium in said two portions and the amount of medium discharged from and air added to the system so as to control the specific gravity of the dehydrated product.

JOSEPH M. HALL.